United States Patent Office.

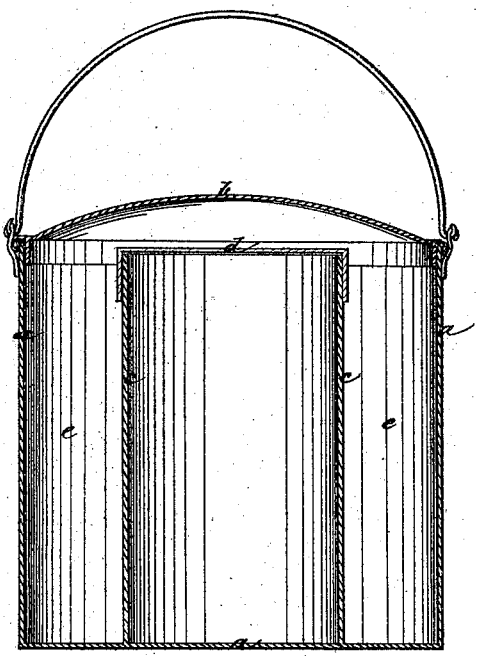

GEORGE A. NASH, OF NILES, MICHIGAN.

Letters Patent No. 107,949, dated October 4, 1870.

---

IMPROVEMENT IN ICE-CREAM PAILS.

---

The Schedule referred to in these Letters Patent and making part of the same.

---

*To all whom it may concern:*

Be it known that I, GEORGE A. NASH, of Niles, in the county of Berrien and State of Michigan, have invented a new and useful Improvement in Ice-cream Pails, of which I hereby declare the following to be a full, clear, and exact description, reference being had to the accompanying drawing making a part of the same, in which—

The figure is a vertical section.

This invention consists of a covered tin pail, having a receptacle for the ice-cream permanently secured to the bottom of the pail, and provided with a cover which makes it air-tight, arranged in such a manner that a freezing mixture, such as ice and salt, can be introduced into the space between the outside of the receptacle and the inside of the pail, the object of the invention being to keep small quantities of ice-cream frozen.

In the drawing—

$a$ is a tin pail, provided with the cover $b$.

$c$ is the receptacle, provided with a cover, $d$, permanently secured to the bottom of the pail $a$.

The ice-cream is put into the receptacle $c$, and the cover $d$ placed upon it, making it air-tight.

The freezing mixture is placed in the space $e$, surrounding the receptacle $c$.

The cover $b$ is placed upon the pail $a$, and prevents the freezing mixture from thawing, so that, by this device, ice-cream can be kept frozen for a long time after being taken from the freezer in which it was originally frozen.

Having thus described my invention,

What I claim, and desire to secure by Letters Patent, is—

As a new article of manufacture, an ice-cream pail, consisting of the pail $a$, provided with the cover $b$, in which the receptacle $c$, having the cover $d$, is placed and permanently secured to the bottom of the pail $a$, as herein shown and described.

G. A. NASH.

Witnesses:
JOS. P. MARSTON,
FRANKLIN MUZZY.